United States Patent [19]

Schwestka

[11] 4,003,511
[45] Jan. 18, 1977

[54] METHOD AND APPARATUS FOR ALIGNING STRIP END PORTIONS IN A CONTINUOUS STRIP OPERATION

[75] Inventor: Crayton H. Schwestka, Michigan City, Ind.

[73] Assignee: National Steel Corporation, Pittsburgh, Pa.

[22] Filed: Apr. 15, 1976

[21] Appl. No.: 677,170

[52] U.S. Cl. .................................... 226/3; 226/20; 228/49

[51] Int. Cl.$^2$ ........................................ B65H 25/26

[58] Field of Search ............. 226/3, 15, 18, 19, 20, 226/45; 228/47, 49

[56] References Cited

UNITED STATES PATENTS

| | | | |
|---|---|---|---|
| 3,355,079 | 11/1967 | Ellis | 228/47 |
| 3,370,771 | 2/1968 | Shay | 226/3 X |
| 3,475,580 | 10/1969 | Morley | 226/20 X |
| 3,577,627 | 5/1971 | Woodward | 228/49 X |

*Primary Examiner*—Richard A. Schacher
*Attorney, Agent, or Firm*—Shanley, O'Neil and Baker

[57] ABSTRACT

Method and apparatus for aligning strip end portions prior to a welding step in continuous strip treating equipment having a longitudinal centerline in the direction of strip movement in which there is a first strip running through the line having a trailing end portion and a second strip to be fed into the line having a leading end portion, the invention comprising means and steps for determining the longitudinal direction of the first strip trailing end portion, providing a strip positioning member contiguous to the second strip leading end portion disposed parallel to the longitudinal direction of the first strip trailing end portion, the strip positioning member being laterally disposed in a position relative to the longitudinal centerline of the equipment whereby the second strip leading end portion can be aligned longitudinally and laterally with the first strip trailing end portion so that the strips can be welded together without the formation of a dog leg in the resulting welded strip.

8 Claims, 4 Drawing Figures

METHOD AND APPARATUS FOR ALIGNING STRIP END PORTIONS IN A CONTINUOUS STRIP OPERATION

BACKGROUND OF THE INVENTION

In continuous strip treating lines, such as continuous strip tinplating lines, it is customary to run the line continuously because of the difficulties encountered in stopping the strip, which stoppage would result in considerable length of strip remaining stationary in contact with the electroplating solution. There is thus required provision of means for holding a second coil of strip in readiness to go through the line while the first coil is uncoiling plus means for storing a sufficient length of strip so that strip can be paid out of the storage and through the plating line while the leading end of the new coil is welded to the trailing end of the strip going through the line.

One of the difficulties plaguing this type of operation has been caused by the failure to align the trailing end of the running strip with the leading end portion of the strip from the new coil. Where such alignment is not present, a misalignment, called a dog leg, occurs between the trailing end of the running strip and the leading end of the new strip. This misalignment or dog let causes considerable difficulties in the strip handling and treating operations in the processing line.

Elimination of dog leg has previously been proposed where the trailing end of the running strip is displaced laterally from the center line of the plating equipment with provisions for lateral movement of the leading end portion of the new strip so as to bring the two strip ends into lateral and longitudinal alignment at the time of the rolling operation. This development failed to take into account the fact that the trailing end of the running strip is sometimes disposed at an angle to the centerline of the electroplating line equipment.

Where it has been recognized that the running strip trailing end portion may be at an angle to the center line of the electroplating line equipment in the past, the proposed remedy has been to move the running strip trailing end portion after it has been stopped for the welding operation to bring the running strip trailing end portion into parallelism or alignment with the center line of the electroplating line equipment. In the latter development, the new strip leading end portion was also placed in parallelism or alignment with the longitudinal center line of the electroplating line equipment. After these operations, completion of the welding operation resulted in a strip without dog leg. Thus where the presence of angular displacement of the running strip has been recognized, the solution has involved complicated procedures and apparatus.

Examples of prior art systems for aligning strip end portions in continuous strip treating lines are U.S. Pat. Nos. 3,355,079, 3,370,771 and 3,577,627 and to avoid needless disclosure of specific strip handling equipment in this patent application, the disclosures of these patents are incorporated in this application by reference.

The present invention takes into account the possibility of the running strip being sometimes disposed at an angle to the longitudinal center line of the electroplating line equipment and by the simplest possible procedure and apparatus aligns the trailing end of the running strip with the leading end of the new strip to eliminate dog leg and lateral misalignment.

SUMMARY OF THE INVENTION

The present invention is for use in connection with continuous strip processing equipment having a longitudinal center line in the direction of strip movement through the equipment, in which there is apparatus for aligning the longitudinal center line of the trailing end portion of a first strip with the longitudinal center line of the leading end portion of a second strip prior to the step of welding the strip end portions together, the apparatus comprising first sensing means for sensing the position of one side edge of the first strip trailing end portion relative to the longitudinal center line of the processing equipment at a first point along the length of the first strip, second sensing means for sensing the position of the one side edge of the first strip trailing end portion relative to said center line at a second point along the length of the first strip spaced from the first point in the direction of movement of the strip through the equipment, signal generating means actuated in response to the positions of the one side edge of the first strip indicated by the first and second sensing means for generating a signal indicative of the distance between the second point and said center line and of the angle, if any, a first vertical reference plane passing through the second point and the first point makes with a second vertical reference plane parallel to said second line and passing through said second point, a first strip engaging element movable toward and away from the second strip, first strip engaging element actuating means connected to the first strip engaging element for moving the first strip engaging element, the first strip engaging element actuating means being movable along a first path, the first path being perpendicular to the second reference plane, an extension of the first path intersecting the second reference plane at a point located at a first predetermined distance in the second reference plane from the second and first points in the direction opposite to movement of the strip through the equipment, a second strip engaging element movable toward and away from the second strip, second strip engaging element actuating means connected to the second strip engaging element for moving the second strip engaging element, the second strip engaging element actuating means being movable along a second path, the second path being perpendicular to the second reference plane, an extension of the second path intersecting the second reference plane at a point located at a predetermined distance greater than the first predetermined distance in the second reference plane from the second and first points in the direction opposite to movement of the strip through the equipment, and signal operating means actuated by the signal generated by the signal generating means for causing movement of the strip engaging element actuating means to dispose the first and second strip engaging elements in the first reference plane or in a plane parallel to the first reference plane, whereby the second strip leading end portion one side edge can be brought into registry with the strip engaging elements of the strip positioning member for aligning the longitudinal center line of the second strip leading end portion with the longitudinal center line of the first strip trailing end portion.

The present invention also includes means for generating a second signal proportional to the width of the second strip where the second strip is not the same width as the first strip, means for algebraically adding the second signal to the first signal, the second signal having a character such that the first and second strip engaging elements are disposed in a reference plane parallel to the first reference plane located a distance from the longitudinal center line of the second strip equal to one half the width of the second strip when the longitudinal center line of the second strip leading end portion is aligned with the longitudinal center line of the first strip trailing end portion.

The method of the present invention is used in connection with continuous strip handling utilizing apparatus having a longitudinal center line in the direction of strip movement through the apparatus where a longitudinal portion of the trailing end portion of a first strip is aligned with a longitudinal portion of the leading end portion of a second strip prior to the step of welding the strip end portions together, the method comprising sensing the position of one side edge of the first strip trailing end portion at a first point along the length of the first strip, sensing the position of the one side edge of the first strip trailing end portion at a second point along the length of the first strip spaced from the first point in the direction of movement of the strip through the equipment, generating a signal indicative of the distance between the second point and said center line and of the angle, if any, a first vertical reference plane passing through the second point and the first point makes with a second vertical reference plane parallel to the longitudinal center line of the apparatus and passing through the second point, providing first and second strip engaging elements disposed along the length of one side edge of the second strip leading end portion, providing actuating means for moving the strip engaging elements toward and away from the second strip, moving the first strip engaging element actuating means toward and away from the second strip along a first path which is perpendicular to the second reference plane, an extension of the first path intersecting the second reference plane at a third point located in the second reference plane at a first predetermined distance from the second point in the direction opposite to movement of the strip through the equipment, moving the second strip engaging element actuating means toward or away from the second strip along a second path which is perpendicular to the second reference plane, an extension of the second path intersecting the second reference plane at a fourth point located in the second reference plane at a second predetermined distance greater than the first predetermined distance from the second point in the direction opposite to movement of the strip through the equipment, and utilizing the generated signal for controlling movement of the strip engaging element actuating means to dispose the strip engaging elements in the first reference plane or in a plane parallel to the first reference plane.

The method of the present invention also includes generating a second signal proportional to the width of the second strip where the second strip is not the same width as the first strip, algebraically adding the second signal to the first mentioned generated signal and prior to utilizing the first mentioned signal for positioning the respective strip engaging elements, the second signal having a character such that the first and second strip engaging elements are disposed in a plane parallel to the third reference plane located at a point spaced from the longitudinal center line of the second strip leading end portion a distance equal to one half the width of the second strip when the longitudinal center line of the second strip leading end portion is aligned with the longitudinal center line of the first strip trailing end portion.

DETAILED DESCRIPTION OF A PREFERRED EMBODIMENT OF THE APPARATUS AND A PREFERRED VARIANT OF THE METHOD

Figure 1:
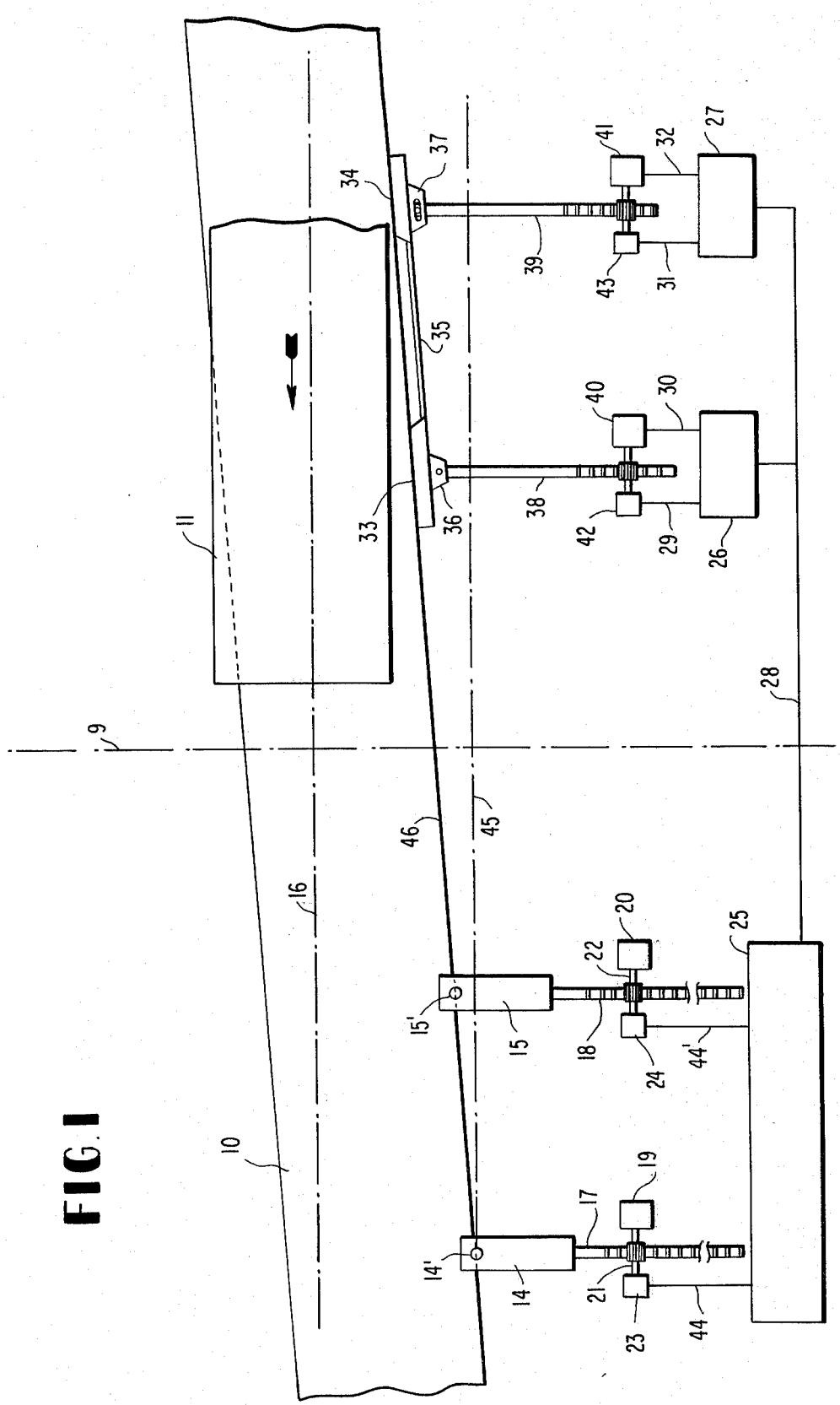
FIG. 1 is a diagrammatic plan view of apparatus embodying the present invention and for carrying out the method of the present invention.
Figure 2:
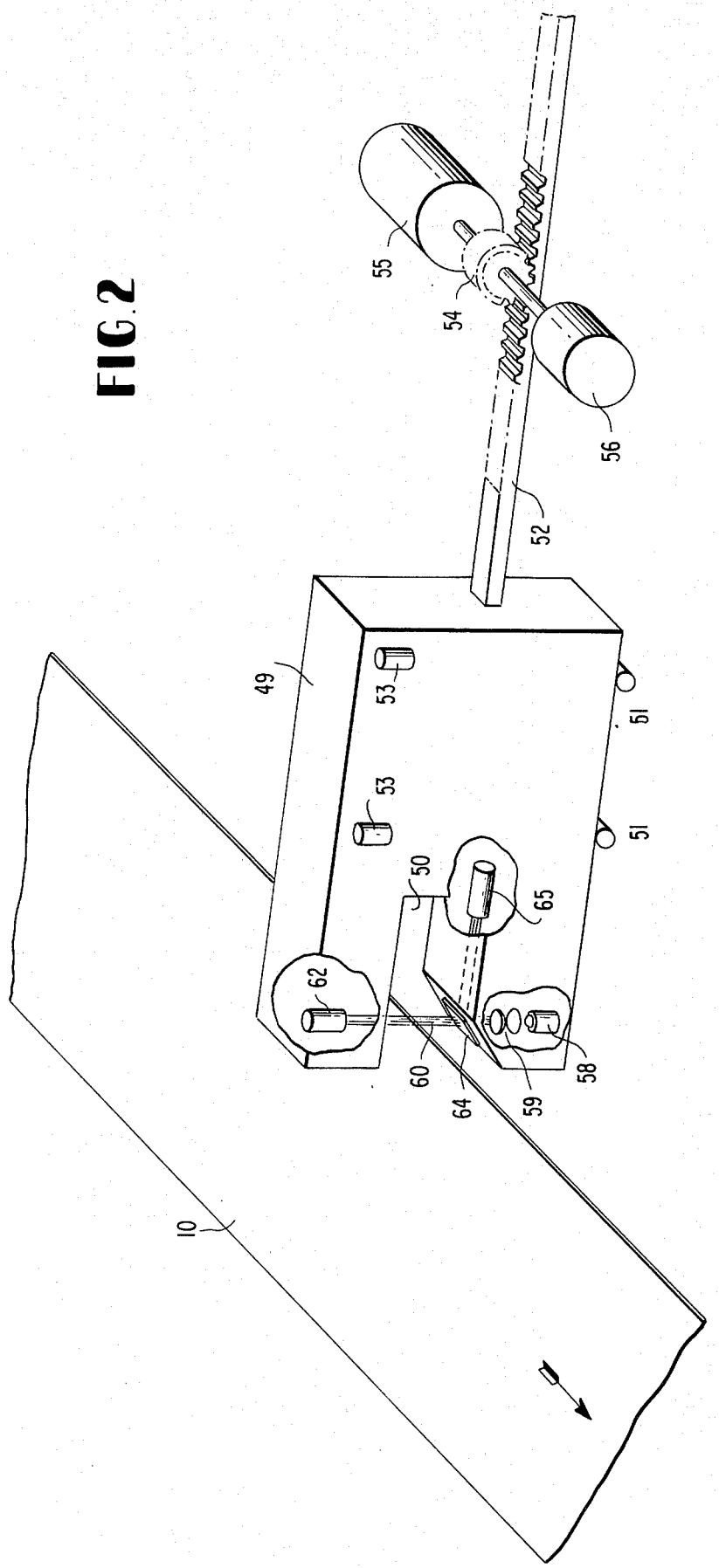
FIG. 2 is a view in perspective, partly diagrammatic, with parts broken away, illustrating the apparatus and operation of a functional unit of equipment for use in the apparatus of FIG. 1.
Figure 3:
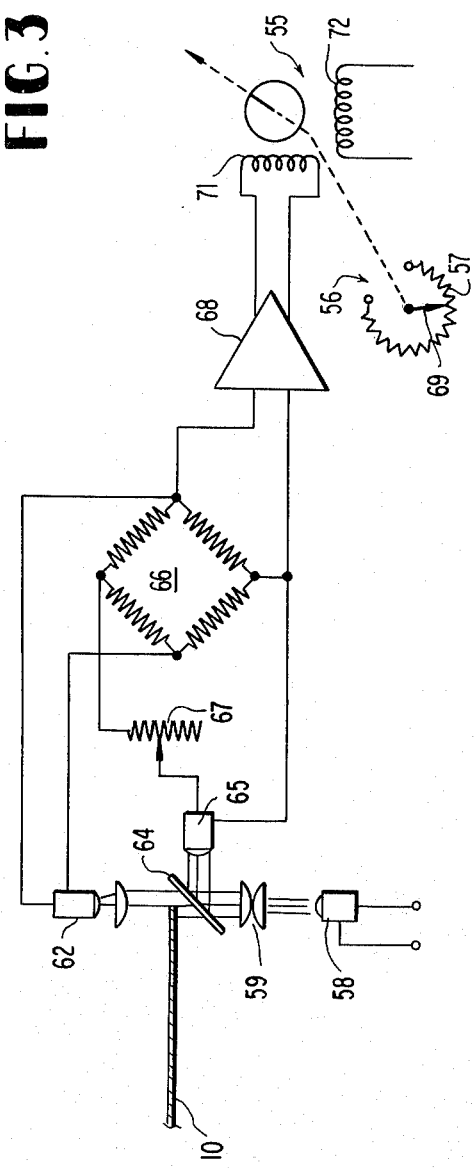
FIG. 3 is a circuit diagram for the typical operating unit of FIG. 1.

FIG. 1 shows diagrammatically the trailing end portion of a running strip 10 and the leading end portion of an entering strip 11 in the neighborhood of the shear-welder, the center line of which is indicated at 9, in a continuous strip treating line, such as an electrolytic tinplating line. Contiguous to one side edge of running strip 11 are linearly spaced sensing members or detectors 14 and 15, the purpose of which is to locate continuously that edge of the running strip so as to determine the position of that edge of the running strip relative to the longitudinal center line 16 of the strip treating equipment. Each edge sensing member 14, 15 is movable toward and away from the edge of the strip in a path perpendicular to center line 16 of the equipment by actuating bars or members 17 and 18, members 17 and 18 being driven by motors 19 and 20 through the medium of racks on actuating members 17 and 18 and coacting pinion gears carried by shafts 21 and 22 of motors 19 and 20. At the other ends of shafts 21 and 22 are position detectors 23 and 24 which act to indicate the position of the sensing detectors 14 and 15 by generating signals characteristic of these positions. The specific mechanical and electrical aspects of a typical edge sensing detector, such as 14 and 15, and associated apparatus are illustrated in FIGS. 2 and 3 and will be described in more detail in connection with those figures.

Referring back to FIG. 1, the electrical circuits activated by the signals generated by position indicators 23 and 24 are diagrammatically represented by rectangles 25, 26 and 27 and associated electrical conductors 44, 44', 28, 29, 30, 31 and 32.

Contiguous to the side edge of the leading end portion of entering strip 11 are a pair of strip-engaging elements 33 and 34 which are shown rigidly connected to one another by connection 35. Strip engaging elements 33 and 34 are pivotally connected at 36 and 37 to rack bars or actuating members 38 and 39, similar to the bars 17 and 18 and as in the former case rack bars 38 and 39 perpendicular to the center line 16 of the equipment and are driven by motors 40 and 41 and associated pinion gears in operative relation to the rack bars. Position indicators 42 and 43 generate signals which are characteristic of the positions of strip engaging elements 33 and 34.

For convenience in describing the present invention, a vertical reference plane 45 is shown parallel to the center line 16 of the equipment and passing through the point 14', indicated by the sensing device 14 as being the location of the edge of running strip 10, together with a second vertical reference plane 46 passing through point 14' and point 15' which is indicated by sensing device 15 as the edge of the strip. As indicated in FIG. 1, the angle between vertical reference planes 45 and 46 indicates the skew, if there is any, between the center line of running strip 10 and the center line 16 of the equipment. It will be apparent therefore that sensing devices 14 and 15 transmit to the electrical circuitry diagrammatically illustrated by rectangle 25 a pair of electrical signals which in the circuits of rectangle 25 are combined to give an indication of the angle of skew of running strip 10, if any. This resulting signal is transmitted through conductor 28 to rectangles 26 and 27 which represent simple computers. Since the distance between point 14' and the point at which the actuating member 38 for strip engaging element 33 intersects reference plane 45 is known and similarly the distance between point 14' and the point at which the actuating member 39 for edge engaging element 34 intersects plane 45 is known, computers 26 and 27 can be programmed to multiply the tangent of the angle of skew, as represented by the signal coming into the computers on conductor 28 by each of these distances to determine how actuating members 38, 39, respectively, should be moved to position strip engaging elements 33 and 34 at the same angle of skew. When the last has been achieved, the leading end portion of strip 11 can be manually manipulated into contact with elements 33 and 34 to align the entering strip with the running strip. During these operations, the running strip has continued to run, these operations being designed to take place before the associated coil runs out so as to expedite the strip joining operation. When the running strip coil runs out, the ends of both strips are sheared and welded.

Actuating members 38 and 39 for strip engaging elements 33 and 34 have been described as moving in paths perpendicular to reference plane 45. It will be noted that this requires a sliding pivot at 37, due to the rigid connection 35 between elements 33 and 34. Of course structure 33, 34 and 35 could be a framework extending a considerable distance back from the edge of the entering strip and past reference plane 45; however, actuating members 38 and 39 would still move in paths perpendicular to reference plane 45. In such case, extensions of the paths would intersect reference plane 45. In this specification and claims, "paths" and "extensions of paths" are used synonymously because, in addition to the foregoing, with the angle of skew reversed relative to reference plane 45, the paths would have to be extended to intersect plane 45.

Turning now to FIGS. 2 and 3, typical equipment suitable for use as the equipment indicated at 14, 17, 19, 21 and 23 will be described. A casing is shown at 49 having a cutaway section 50 to receive the edge of strip 10, the casing being rigidly supported on a rack bar or actuating member 52 for movement toward and away from strip 10 by a pinion 54 driven by a servo-drive motor 55. A position detector 56, supplemented by electrical circuits to be described, generates signals the character of which indicate the location of the sensing member relative to a reference point. The edge detector element itself includes a light source 58 and a lens system 59 for producing a beam of parallel rays 60. A photoelectric cell or light detector is shown at 62 positioned in the path of beam 60. A half-silvered mirror 64 diverts a measured quantity of the light beam to a reference light detector 65. Casing 49 is movably supported on rollers 51 and guided by side rollers 53 for movement toward and away from strip 10.

Photoelectric cell 62 is calibrated so that when one half of beam 60, for example, is intercepted by the edge of the strip, detector 62 is inactive. Referring to FIG. 3, if less than half the light beam is intercepted, detector 62 can be designed to emit a signal of one polarity and in such case if more than half the beam is intercepted detector 62 emits a signal of the opposite polarity. The signal from detector 62 and a constant output signal from reference light detector 65 are compared in Wheatstone bridge circuit 66, with the output from the bridge being converted to AC and amplified in amplifier 68 and transmitted to one phase of a two-phase AC motor 55 through winding 71. The other phase 72 of this motor is supplied from a reference AC supply, the amplifier output and the reference supply normally having a 90° phase displacement from each other. As shown in FIG. 2, motor 55 drives the casing 49 containing the light source and detectors through actuating member 52. Thus the sensing detector is maintained at the edge of strip 10 by moving the detector one way when less than one half the light beam is intercepted and the other way when more than one half the light beam is intercepted. Position detector 56, which is rotated by motor 55, comprises a multiturn potentiometer 57 (FIG. 3) having a wiper or moving contact 69 which transduces the location of the edge of the strip to an electrical signal when a supply voltage is impressed across the potentiometer, as described in more detail below.

The physical equipment for moving the strip edge sensing detectors 14 and 15 and strip engaging elements 33, 34 pictured in FIG. 1 can be similar to that more specifically disclosed in FIG. 2 at 52, 54, 55 and 56, with in the case of the strip engaging elements 33, 34 of FIG. 1, these elements taking the place of casing 49 of FIG. 2. For this reason strip engaging elements motivating equipment is not being specifically illustrated.

The electrical circuits provided for the operation of the strip engaging element motivating or actuating mechanisms 38, 39, 40 and 41 will now be described in reference to FIGS. 1, 3 and 4. As mentioned earlier, lead 44, 45, rectangle 25 and conductor 28 are intended to illustrate diagrammatically the electrical circuits which are involved in connection with position detectors 23 and 24 to produce an electrical signal proportional to the angle, if any, between reference planes 45 and 46, which signal is again diagrammatically illustrated as being transmitted to computers 26 and 27 by lead 28. Conductors 29 and 30 connect the output of computer 26 to the position detector 42 and servo-motor 40 of motivating mechanism 38 and conductors 31 and 32 serve these purposes for motivating mechanism 39.

Figure 4:
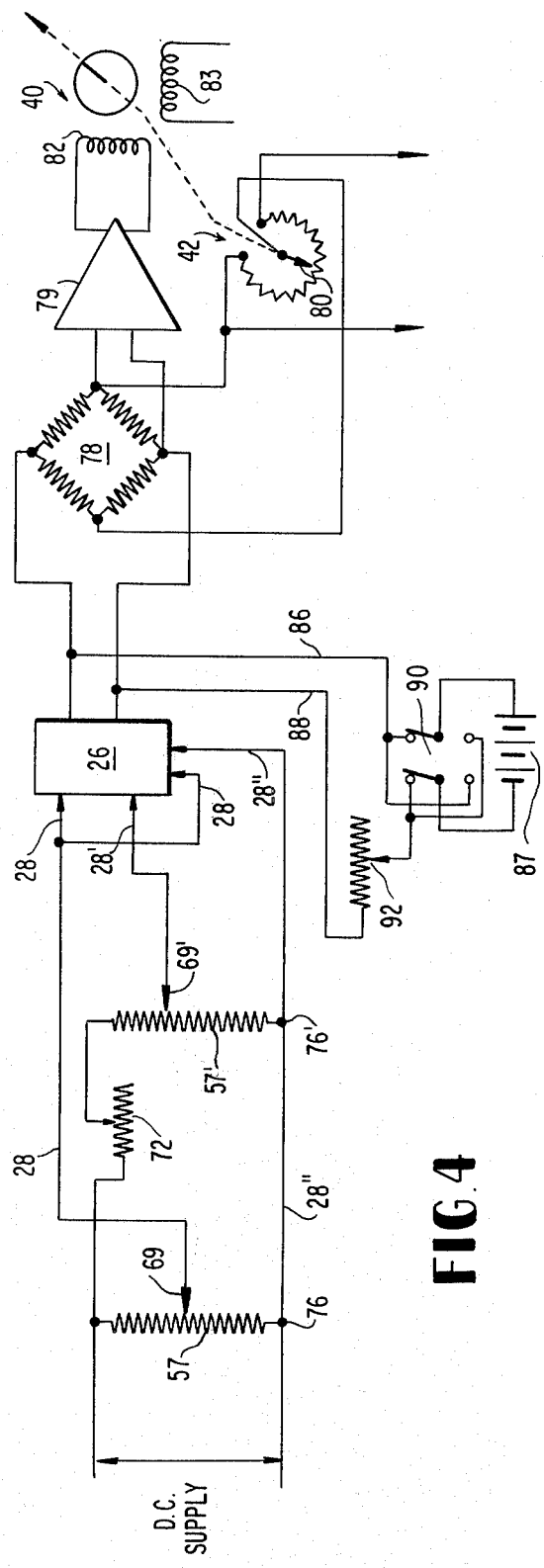
FIG. 4 is a circuit diagram for important parts of the apparatus of FIG. 1.

FIG. 4 is a circuit diagram more specifically showing electrical connections illustrated in the block diagram of FIG. 1. For convenience, in FIG. 4, it has been assumed that the sensing detector and associated equipment illustrated in FIGS. 2 and 3 are used as sensing detector 14 and sensing detector 15 in FIG. 1. Actually the only operating elements of the sensing detector circuits that appear in FIG. 4 are the multiturn potentiometers of position detector 56, the potentiometer 57 of which appears in FIG. 3. For convenience where the two of these potentiometers, representing the two sensing detectors of FIG. 1, appear in FIG. 4, they are identified by reference numerals 57 and 57'. In FIG. 4 the potentiometers are shown in rectilinear form for simplification. The associated wipers or moving contacts of these same potentiometers are indicated as 69 and 69', respectively.

The circuit diagram of FIG. 4 shows a direct current supply voltage of 24 volts as an example, with this voltage being applied across the potentiometers 57 and 57'. A balancing adjustment is indicated at 72 with the adjustment being such that with wiper 69' at the midpoint of potentiometer 57', as indicated by the dash line arrow, there will be no voltage between the electrical connections to the two wipers. This electrical condition is designed to correspond to the physical one where the running strip is the widest strip the equipment is designed to handle and the running strip has its center line coinciding with the center line of the equipment and it follows that a reference signal of 12 volts is available for transmittal to the two computers. It will be evident that as the center line of the running strip departs from the center line of the equipment, the position detectors 23 and 24 of FIG. 1 will cause corresponding movement of both wipers 69 and 69' away from the midpoint of the respective potentiometers. If the running strip develops skew, wiper 69' will move relative to wiper 69. With this latter condition a voltage will develop between the connections to the two wipers.

Inspection of FIG. 4 shows that conductor 28 in FIG. 1 comprises three leads, denominated in FIG. 4 28, 28' and 28", these three leads entering computers 26 and 27. From the description so far, taken with FIG. 4, it will be evident that the voltage between potentiometer 57 end point 76 and wiper 69 can be calibrated to signify the location of reference plane 45 relative to center line 16 of the equipment with the widest running strip the equipment will handle, i.e., when the center line of such strip coincides with the center line of the equipment, this voltage will be 12 volts. Movement of the strip either way off the center line of the equipment while parallel thereto will through sensor detector 14 move wiper 69 to change this voltage. On the other hand, where such parallelism is not present, the voltage between similar points 76' and 69' on potentiometer 57', by indicating the location of sensing detector 15, will give an indication of skew in the running strip by its difference in value from the voltage between the 76 and the 69 points, the polarity of this differential indicating the direction of skew. Thus two voltages are fed into computers 26 and 27, the one by leads 28 and 28" between points 76 and 69, corresponding to the position of reference plane 45 and the other by leads 28, 28' between points 69 and 69' where there is a voltage differential representing the angle between planes 45 and 46, showing skew. A voltage of 12 volts between leads 28 and 28" in the illustrated version does not affect the output of computer 26 or 27 since this is the reference voltage.

The output of computer 26 is applied to bridge 78 and the output of bridge 78 converted to AC and amplified in amplifier 79 which feeds one phase to winding 82 of a twophase AC motor corresponding to motor 10 in FIG. 1. The other phase of the motor is supplied from a reference AC supply. The servo-motor system 40 moves strip engaging element 33 until wiper 90 of the potentiometer of position detector 42 stops the movement.

Computer 27 operates similarly with a difference brought out below.

An example of operation of the present invention follows:

Assuming that point 14' as shown in FIG. 1 is so positioned that wiper 69 is at the midpoint of potentiometer 57 (although the position of strip 10 relative to the center line of the equipment in FIG. 1 indicates otherwise), with the distance between points 14' and 15' along reference plane 45 being 24 inches, the distance in reference plane 45 between point 14' and a perpendicular dropped from point 33 to reference plane 45 being 60 inches, the distance between point 14' in reference plane 45 and a perpendicular dropped from point 34 to reference plane 45 being 96 inches and point 15' being two inches from reference plane 45 along a perpendicular dropped from point 15' to reference plane 45, it will be seen that the tangent of the angle of skew in FIG. 1 would be two inches over 24 inches which equals 0.0833 which in turn equals tangent 4.764°. Since with the widest running strip the reference voltage between line 28 and line 28" is 12 volts which is numerically equal to one half the distance between point 14' and point 15', the computer will be programmed to solve the following: plus tangent 4.764 times 60, all divided by 2 equals +2.5 volts. This output of 2.5 volts would be applied to bridge 78. The output of the bridge would be converted to AC and amplified in amplifier 70 to feed one phase of twophase AC motor 40 (see FIG. 1) through winding 82. The servo-motor system 40 would move strip engaging member 33 until wiper 80 of the feed-back potentiometer of position detector 42 picks off a potential of −2.5 volts. At this point, the bridge is balanced and the strip engaging element is located five inches beyond reference plane 45. Simultaneously leads 28, 28' and 28" are applying the same voltages to computer 27 but computer 27 is programmed to multiply the tangent of 4.764 times 96 inches which equals eight inches and this is the distance strip engaging element 34 is positioned above reference plane 45 in FIG. 1.

All the foregoing is based on the assumption that the running strip is the widest strip the equipment will handle and that the point 14' is located a distance equal to one half the width of the strip off the center line of the equipment.

If point 14' in sensing the edge of running strip 10, through position detector 23, positions wiper 69 on a point other than midpoint of potentiometer 57 due to the running strip being narrower or due to movement of the strip relative to the center line of the equipment or due to skew of the strip, this fact will be indicated in the voltage existing between lines 28 and 28" which is fed into computer 26 as additive to or diminishing the reference voltage, in this example 12 volts. In such event this difference is algebraically added in the computer to any voltage indicating skew and the sum is the voltage applied to the bridge. Looking at it another way, the reference voltage would no longer be 12 volts in the illustrated example but would be more or less depending upon the position of point 14'. Point 15' would obviously be similarly affected in position by the strip width or position with the net result that in the example, computer 26 would merely produce a voltage higher or lower than 2.5 volts by the difference in the position of points 14′ and 15′ relative to the center point of potentiometer 57. Reference plane 45 would continue to pass through point 14′ for the purposes of this disclosure. Since the voltage applied to bridge 78 would be higher or lower than the 2.5 volts, the servomotor would move the strip engaging element more or less to achieve the balance in position detector 42. Of course the same reasoning would apply to strip engaging element 34 and position detector 43 and computer 27. Reference plane 45 is located by the position of wiper 69 on potentiometer 57. Therefore reference plane 45 would always follow point 14′, as would the other points 15′, 33 and 34 which would move correspondingly, subject to skew. This will be more readily seen if it is assumed that the center line of the running strip remains parallel to the center line of the equipment but gradually shifts laterally of the center line of the equipment, one side of the center line of the equipment applying a positive voltage (more than the reference voltage), the other side applying a negative voltage (less than the reference voltage).

Where the width of the entering strip is greater or less than the width of running strip 10, an artificial feedback signal is set up for application of a positive or negative voltage to each of the two servo-systems 40 and 41 controlling the position of the alignment bar. This can be accomplished by a manually controlled source of potential, the magnitude of the artificial signal thus provided being proportional to one half of the difference of the strip widths. This is diagrammatically illustrated in FIG. 4 where leads 86 and 88 are connected between the output of computer 26 and a source of voltage 87 with a reversing switch arrangement 90 and a manually controlled reostat 92 for controlling the amplitude of the voltage applied to the output of computer 26. If the entering strip is wider, one polarity of voltage is used; if the entering strip is narrower, the other polarity is used. The resultant voltage applied to bridge 78 positions strip engaging element 33 at the proper distance for the new width entering strip. Of course similar apparatus takes care of strip engaging element 34 through computer 27, with the two reostats being ganged for this purpose.

The above embodiments are to be considered in all respects as illustrative and not restrictive since the invention may be embodied in other specific forms without departing from its spirit or essential characteristics. Therefore, the scope of the invention is indicated by the claims rather than by the foregoing description, and all changes which come within the meaning and range of the equivalents of the claims are intended to be embraced therein.

What is claimed is:

1. In continuous strip processing equipment having a longitudinal center line in the direction of strip movement through the equipment, apparatus for aligning the longitudinal center line of the trailing end portion of a first strip with the longitudinal center line of the leading end portion of a second strip prior to the step of welding the strip end portions together, the apparatus comprising first sensing means for sensing the position of one side edge of the first strip trailing end portion relative to the longitudinal center line of the processing equipment at a first point along the length of the first strip, second sensing means for sensing the position of the one side edge of the first strip trailing end portion relative to said center line at a second point along the length of the first strip spaced from the first point in the direction of movement of the strip through the equipment, signal generating means actuated in response to the positions of the one side edge of the first strip indicated by the first and second sensing means for generating a signal indicative of the distance between the second point and said center line and of the angle, if any, a first vertical reference plane passing through the second point and the first point makes with a second vertical reference plane parallel to said center line and passing through the second point, a first strip engaging element movable toward and away from the second strip, first strip engaging element actuating means connected to the first strip engaging element for moving the first strip engaging element, the first strip engaging element actuating means being movable along a first path, an extension of the first path intersecting the second reference plane at a third point located at a first predetermined distance in the second reference plane from the second point in the direction opposite to movement of the strip through the equipment, a second strip engaging element movable toward and away from the second strip, second strip engaging element actuating means connected to the second strip engaging element for moving the second strip engaging element, the second strip engaging element actuating means being movable along a second path, an extension of the second path intersecting the second reference plane at a fourth point located at a predetermined distance in the second reference plane from the second point greater than the first predetermined distance in the direction opposite to movement of the strip through the equipment, and signal operated means actuated by the signal generated by the signal generating means for causing the strip engaging element actuating means to dispose the first and second strip engaging elements in the first reference plane or in a plane parallel to the first reference plane if the width of the second strip is different from that of the first strip, whereby the second strip leading end portion one side edge can be brought into registry with the strip engaging elements of the strip positioning member for aligning the longitudinal center line of the second strip leading end portion with the longitudinal center line of the first strip trailing end portion.

2. The apparatus of claim 1 in which the signal operated means includes means actuated by the signal generated by the signal generating means for multiplying the tangent of said angle by the distance in the second reference plane between the first path and the second point to give a second signal, means actuated by the second signal for positioning the first strip engaging element in the first reference plane or a plane parallel to the first reference plane if the width of the second strip is different from that of the first strip, means actuated by the signal generated by the signal generating means for multiplying the tangent of said angle by the distance in the second reference plane between the second path and the second point to give a third signal, and means actuated by the third signal for positioning the second strip engaging element in the first reference plane or a plane parallel to the first reference plane if the width of the second strip is different from that of the first strip.

3. The apparatus of claim 2 including means for generating a fourth signal proportional to the width of the second strip where the second strip is not the same width as the first strip, means for algebraically adding the fourth signal to the second and third signals, respectively, the fourth signal having a character such that the first and second strip engaging elements are disposed in a reference plane parallel to the first reference plane located a distance from the longitudinal center line of the second strip equal to one half the width of the second strip when the longitudinal center line of the second strip leading end portion is aligned with the longitudinal center line of the first strip trailing end portion.

4. The apparatus of claim 1 including means for generating a second signal proportional to the width of the second strip where the second strip is not the same width as the first strip, means for algebraically adding the second signal to the first signal, the second signal having a character such that the first and second strip engaging elements are disposed in a reference plane parallel to the first reference plane located a distance from the longitudinal center line of the second strip equal to one half the width of the second strip.

5. In continuous strip handling utilizing apparatus having a longitudinal center line in the direction of strip movement through the apparatus where a longitudinal portion of the trailing end portion of a first strip is aligned with a longitudinal portion of the leading end portion of a second strip prior to the step of welding the strip end portions together, the method comprising sensing the position of one side edge of the first strip trailing end portion at a first point along the length of the first strip, sensing the position of the one side edge of the first strip trailing end portion at a second point along the length of the first strip spaced from the first point in the direction of movement of the strip through the equipment, generating a signal indicative of the distance between the second point and said center line and of the angle, if any, a first vertical reference plane passing through the second point and the first point makes with a second vertical reference plane parallel to the longitudinal center line of the apparatus and passing through the second point, providing first and second strip engaging elements disposed along the length of one side edge of the second strip leading end portion, providing actuating means for moving the strip engaging elements toward and away from the second strip, moving the first strip engaging element actuating means toward or away from the second strip along a first path an extension of the first path intersecting the second reference plane at a third point located in the second reference plane at a first predetermined distance from the second point in the direction opposite to movement of the strip through the equipment, moving the second strip engaging element actuating means toward or away from the second strip along a second path, an extension of the second path intersecting the second reference plane at a fourth point located in the second reference plane at a predetermined distance greater than the first predetermined distance from the second point in the direction opposite to movement of the strip through the equipment, and utilizing the generated signal for controlling movement of the strip engaging element actuating means to dispose the strip engaging elements in the first reference plane, or in a plane parallel to the first reference plane if the width of the second strip is different from that of the first strip, whereby the second strip leading end portion one side edge can be brought into registry with the strip engaging elements of the strip positioning member for aligning the longitudinal center line of the second strip leading end portion with the longitudinal center line of the first strip trailing end portion.

6. The method of claim 5 in which the last claimed step includes generating a second signal proportional to the product of the tangent of said angle multiplied by the distance in the second reference plane between the first path and the second point, utilizing the second signal for positioning the one strip engaging element in the first reference plane or in a plane parallel to the first plane, generating a third signal proportional to the product of the tangent of said angle multiplied by the distance in the second reference plane between the second path and the second point to give a third signal, and utilizing the third signal for positioning the second strip engaging element in the first reference plane or in a plane parallel to the first reference plane.

7. The method of claim 6 including generating a fourth signal proportional to the width of the second strip where the second strip is not the same width as the first strip, algebraically adding the fourth signal to the second signal and third signal, respectively, prior to utilizing the second and third signals for positioning the respective strip engaging elements, the fourth signal having a character such that the first and second strip engaging elements are disposed in a plane parallel to the third reference plane located at a point spaced from the longitudinal center line of the second strip leading end portion a distance equal to one-half the width of the second strip when the longitudinal center line of the second strip leading end portion is aligned with the longitudinal center line of the first strip trailing end portion.

8. The method of claim 5 including generating a second signal proportional to the width of the second strip where the second strip is not the same width as the first strip, algabraically adding the second signal to the first claimed generated signal and prior to utilizing the first claimed signal for positioning the respective strip engaging elements, the second signal having a character such that the first and second strip engaging elements are disposed in a plane parallel to the third reference plane located at a point spaced from the longitudinal center line of the second strip leading end portion a distance equal to one half the width of the second strip when the longitudinal center line of the second strip leading end portion is aligned with the longitudinal center line of the first strip trailing end portion.

* * * * *